United States Patent [19]

Phlaphongphanich

[11] Patent Number: 4,676,386
[45] Date of Patent: Jun. 30, 1987

[54] NIPPLE

[75] Inventor: Vichai Phlaphongphanich, Bangkok, Thailand

[73] Assignee: Royal American Industries, Inc., Westboro, Mass.

[21] Appl. No.: 815,450

[22] Filed: Dec. 31, 1985

Related U.S. Application Data

[63] Continuation-in-part of Ser. No. 673,665, Nov. 21, 1984, abandoned.

[51] Int. Cl.⁴ .................. A61J 11/00; A61J 11/04
[52] U.S. Cl. ............................. 215/11 R; 128/360
[58] Field of Search ............... 215/11 R, 11 A-11 E; 128/359, 360

[56] References Cited

U.S. PATENT DOCUMENTS

| 1,989,060 | 1/1935 | Liddick | 215/11 R |
| 2,889,829 | 6/1959 | Tannenbaum et al. | 128/360 |
| 3,424,157 | 1/1969 | Di Paolo | 215/11 D |
| 3,593,870 | 7/1971 | Anderson | 215/11 B |
| 3,650,270 | 3/1972 | Frazier | 215/11 B |
| 4,195,638 | 4/1980 | Duckstein | 128/360 |

FOREIGN PATENT DOCUMENTS

| 457009 | 3/1928 | Fed. Rep. of Germany | 215/11 R |
| 2219909 | 3/1973 | Fed. Rep. of Germany | 215/11 R |
| 3347876 | 5/1985 | Fed. Rep. of Germany | 128/359 |
| 54-11183 | 1/1979 | Japan | 215/11 R |
| 584080 | 1/1947 | United Kingdom | 128/359 |

Primary Examiner—William Price
Assistant Examiner—Sue A. Weaver
Attorney, Agent, or Firm—Norman S. Blodgett; Gerry A. Blodgett

[57] ABSTRACT

Baby bottle nipple or pacifier having a mouth portion made of elastomer and a base portion made of semi-rigid thermoplastic polymer. The mouth portion is formed in a hot first mold and the mouth portion is transferred to relatively cold second mold in which the base portion is molded around it.

5 Claims, 17 Drawing Figures

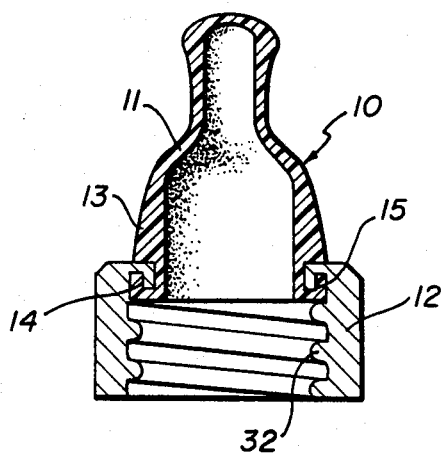
FIG. 4
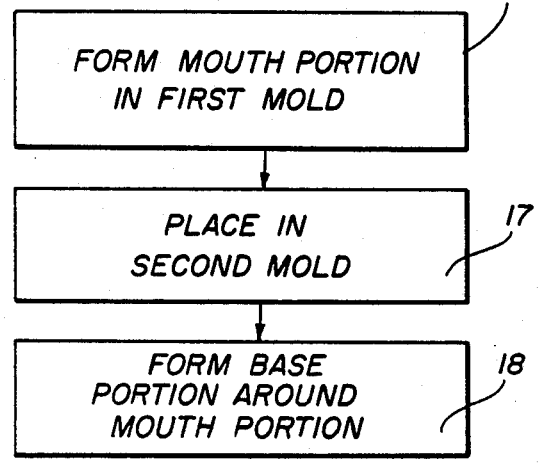
FIG. 5
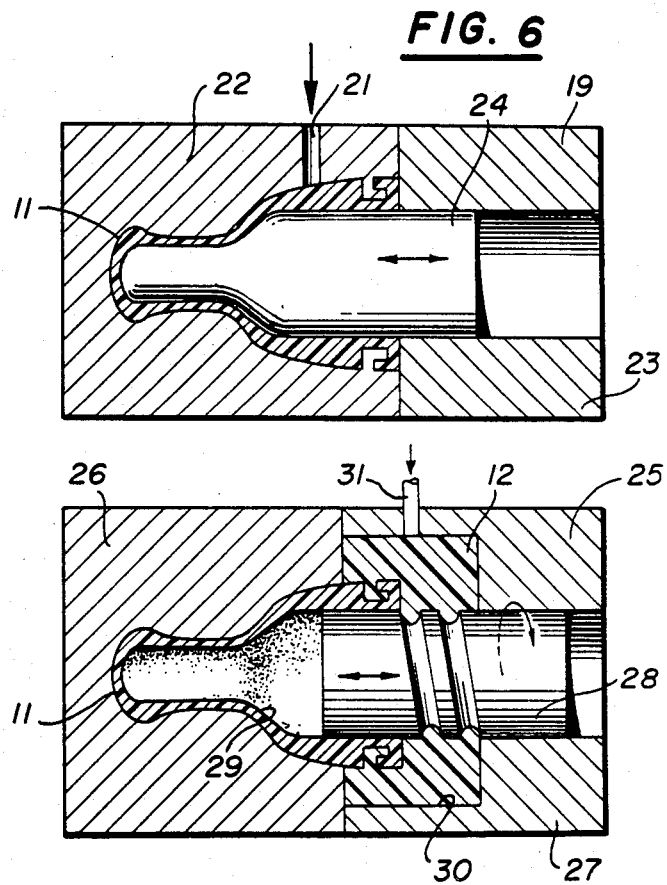
FIG. 6
FIG. 7
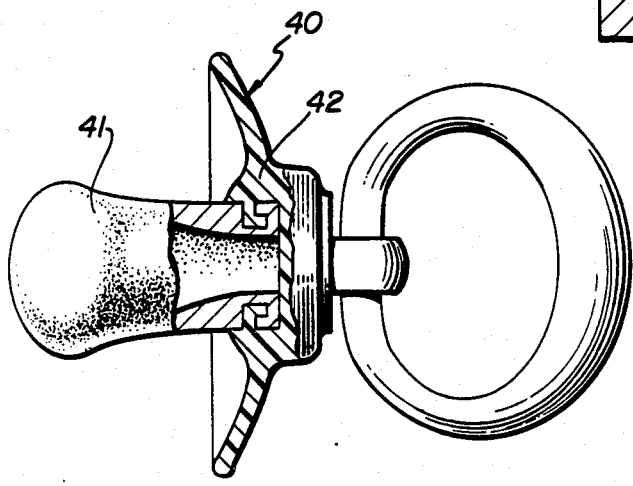
FIG. 8

NIPPLE

This is a continuation-in-part of copending application Ser. No. 673,655 filed on Nov. 21, 1984, abandoned.

BACKGROUND OF THE INVENTION

The traditional construction of baby feeders has involved the provision of a bottle having a wide mouth to which an elastic nipple is attached by means of a threaded cap. When the entire nipple and cap combination is formed from the best materials, such as liquid silicone rubber, it becomes quite expensive. At the same time, the use of an elastic nipple that is separate from a semi-rigid bottle cap leads to a situation in which the baby sometimes pulls the nipple out of the cap. These and other difficulties experienced with the prior art devices have been obviated in a novel manner by the present invention.

It is, therefore, an outstanding object of the invention to provide a nipple or the like formed of a combination of expensive and inexpensive materials.

Another object of this invention is the provision of a nipple which can be attached to a baby bottle in such a way that it cannot be pulled free by the baby.

A further object of the present invention is the provision of a method of manufacturing a hybrid baby bottle nipple with an orthodontic mouth portion.

Another object of the invention is the provision of a nipple or the like in which only a small portion is made of an expensive elastic material.

It is another object of the instant invention to provide a method of making a nipple which is an integral combination of an elastomer mouth portion and a semi-rigid cap portion.

With these and other objects in view, as will be apparent to those skilled in the art, the invention resides in the combination of parts set forth in the specification and covered by the claims appended hereto.

SUMMARY OF THE INVENTION

In general, the invention consists of a nipple or the like having a mouth portion formed of an elastomer having a high melting temperature, and a cap portion formed around the mouth portion, the cap portion being formed of a polymer having a relatively low melting temperature.

More specifically, the invention consists of a method of forming the nipple consisting of forming in a first mold the mouth portion of an elastomer having a high melting temperature, placing the mouth portion in a second mold, and forming a cap portion around the mouth portion of a thermoplastic polymer having a relatively low melting temperature.

BRIEF DESCRIPTION OF THE DRAWINGS

The character of the invention, however, may be best understood by reference its structural forms, as illustrated by the accompanying drawings, in which:

FIG. 4 is a vertical sectional view of the nipple taken on the line IV—IV of FIG. 1, FIG. 5 is a flow chart of the steps used in a process for manufacturing the nipple, FIG. 6 is a vertical sectional view of a first mold used in the process, FIG. 7 is a vertical sectional view of a second mold used in the process, FIG. 8 is an elevational view with portions broken away of a pacifier making use of the principles of the present invention.

DESCRIPTION OF THE PREFERRED EMBODIMENT

Figure 1:
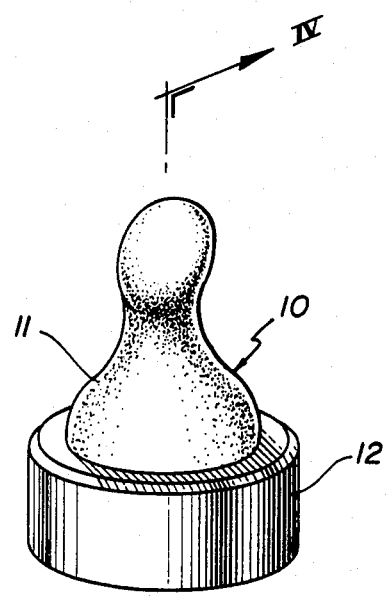
FIG. 1 is a perspective view of a nipple incorporating the principles of the present invention.

Referring first to FIGS. 1–5, which best show the general features of the invention, it can be seen that the nipple, indicated generally by the reference numeral 10, consists of a mouth portion 11 and a base or cap portion 12.

The mouth portion 11 is formed of an elastomer having a high melting temperature. The cap portion 12 is formed around the mouth portion, and is formed of a polymer having a relatively low melting temperature. In the preferred embodiment, the elastomer is liquid silicone rubber.

Figure 2:
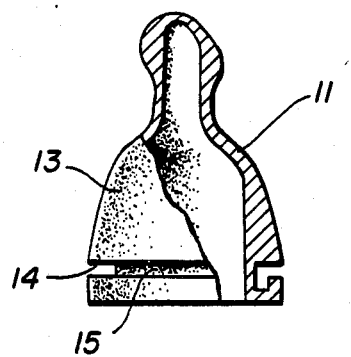
FIG. 2 is a front elevational view of the nipple with portions broken away.
Figure 3:
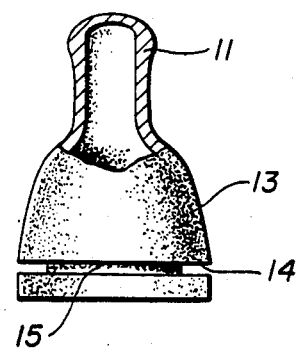
FIG. 3 is a side elevational view of the nipple with portions broken away.

As is evident in FIGS. 2 and 3, the mouth portion 11 has a lower skirt 13 formed with an external groove 14 into which the cap portion is locked. The groove extends entirely around the skirt, has an L-shaped cross-section, and has a textured surface 15.

FIGS. 5, 6, and 7 illustrate the method used in manufacturing the nipple. The process consists of a first step 16 that consists of injection-forming the mouth portion 11 in a first mold 19 of an elastomer having a high melting temperature and then a second step 17 of placing the mouth portion 11 in a second mold 25.

The third step 18 consists of injection-forming the cap portion 12 around the mouth portion of a thermoplastic polymer having a relatively low melting temperature.

Since the nipple is orthodontic, the mouth portion 11 is formed in a non-drawable, thin-walled shape and the elastomer is liquid silicone rubber having a melting temperature in the order of 400° to 500° F. The first mold 19 is operated at a high temperature and the second mold 25 is operated at a relatively low temperature, in the order of 250° F. The elastomer is expensive and the polymer is inexpensive.

In FIG. 6, it can be seen that the first mold 19 consists of a first part 22 having the cavity with an injection port 21 for forming the mouth portion 11, a second part 23, and a third part 24 which defines the interior of the mouth portion. The first part 22 and the second part 23 are moved apart to permit removal of the workpiece or product; the third part may have independant movement to facilitate removal of the mouth portion, which is non-drawable because of the orthodontic shape. This shape makes it necessary to collapse it elastically to permit removal from the mold. This is made necessary also by the configuration of the groove 14.

FIG. 7 illustrates the manner in which the second mold 25 has a first part 26 having a cavity in which the preformed mouth portion 11 is inserted. A second part 27 is provided with a cavity 30 in which the cap portion 12 is formed by injection of molten plastic through an injection port 31. A third part 28 is in the form of a plug that lies in the cavity 30 to define the inner surface of the cavity to support the preform and to form a thread 32 (see FIG. 4) on the inside of the base portion, which the thread serves to lock the assemblage onto the top of a baby bottle. The third part 28 must, of course, be removable by turning in the well-known manner, because of the thread on the product.

The operation and advantages of the invention will now be readily understood in view of the above description. The nipple 11 serves the dual functions of the traditional nipple and baby bottle cap. The unit is threaded onto the baby bottle after the liquid formula has been placed in the bottle. Because of the unitary construction, the baby cannot separate the mouth portion from the base portion, so that the nipple of the invention is very safe to use. The mouth portion 11 can be made of a very satisfactory (but expensive) elastomer, such as liquid silicone rubber, while the base portion 12 can be made of an inexpensive, semi-rigid polymer, such as polypropylene. The resulting combination then becomes inexpensive enough to be commercially acceptable, i.e., affordable by a wide range of consumers.

FIG. 8 shows a pacifier 40 constructed in the manner described above. A mouth portion 41 made of the liquid silicone rubber is formed in a first mold. The material has a high melting temperature, i.e., in the order of 500° F. The mouth portion is then placed in a second mold and a base portion 42 is molded around it, using an injection temperature that is relatively low, such as 250° F.

Figure 9:
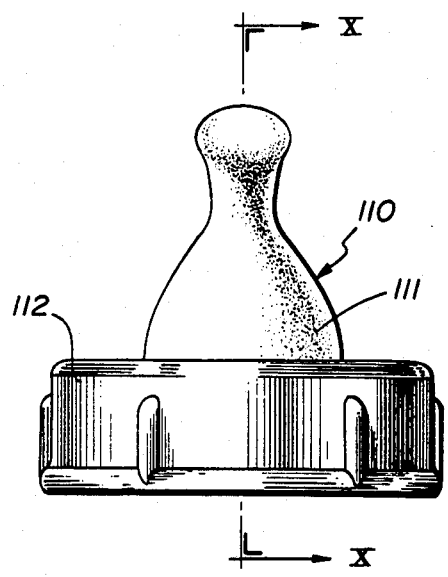
FIG. 9 is a front elevation view of a modified form of the nipple.

FIG. 9 shows a nipple 110 which is a modification of the nipple 10. The nipple 110 is provided with an elastomer mouth portion 111 that is attached to a cap or base portion 112 formed of a semi-rigid polymer.

Figure 10:
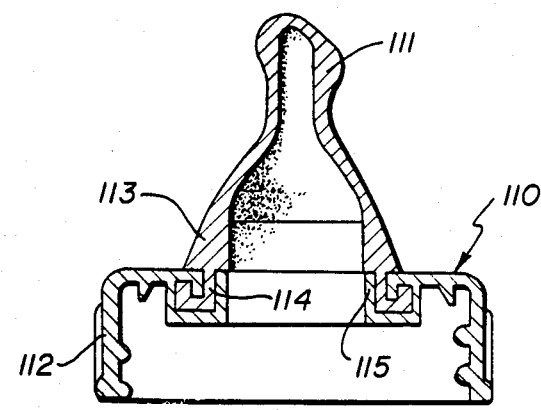
FIG. 10 is a vertical sectional view of the nipple taken on the line X—X of FIG. 9.

FIG. 10 illustrates the manner in which the mouth portion and the base portion are connected. The mouth portion is of orthodontic shape and has a skirt 113 with an annular appendage 114 of U-shaped cross-section. The base portion 112 is formed around the skirt to interlock with the appendage. The base portion is provided with a tubular portion 115 that lies inside the skirt and presses outwardly against the appendage 114. The outer leg of the appendage is larger that the other parts to promote adequate locking.

Figure 11:
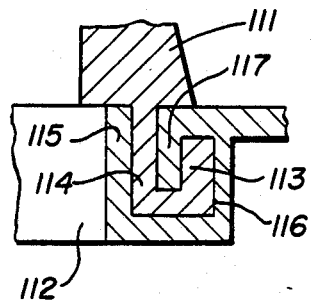
FIG. 11 is an enlarged sectional view of a portion of the nipple.

FIG. 11 shows in detail the details of the interlocking between the mouth portion and the base portion. The base portion 112 has a second tubular portion 116 that lies outside the appendage 114 and presses inwardly against it. The base portion also has a third tubular portion 117 that lies in the appendage 114 and engages the facing surfaces of the U-shaped cross-section.

Figure 12:
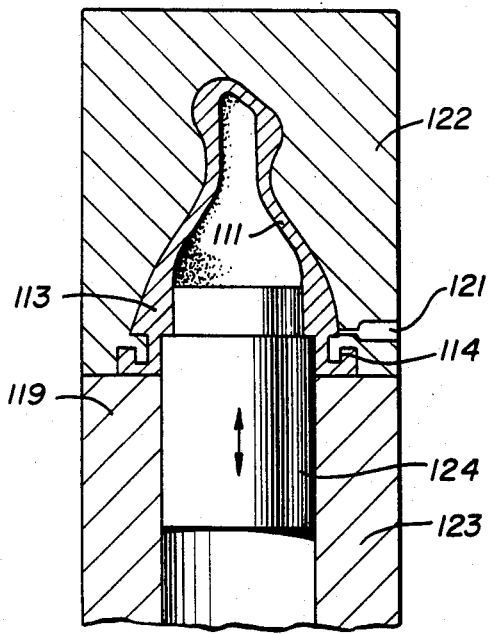
FIG. 12 is a vertical sectional view of a mold for forming the mouth portion of the nipple.

FIG. 12 illustrates the mold 119 that is used to form the mouth portion 111. The mold consists of a first part 122 that contacts a second part 123. An injection port 121 leads into the cavity in which the mouth portion is formed. A third part 124 is slidably carried in a bore in the second part 123. The third part forms and supports the skirt 113 and the appendage 114 during formation.

Figure 13:
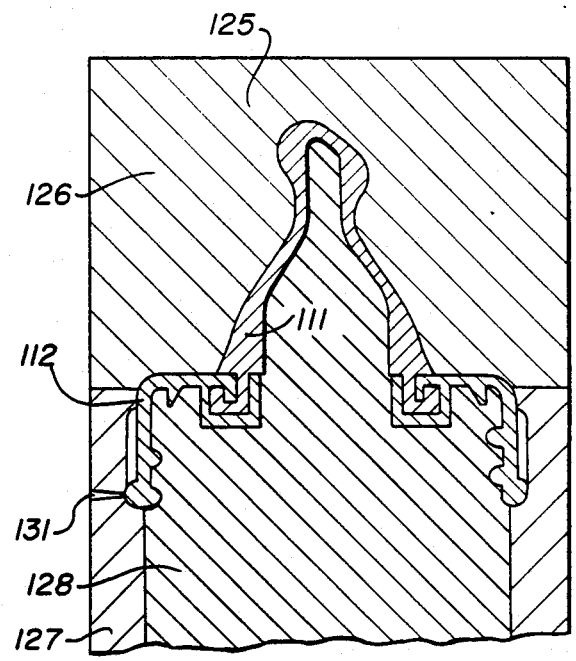
FIG. 13 is a vertical sectional view of a mold for forming the cap portion of the nipple.
Figure 14:
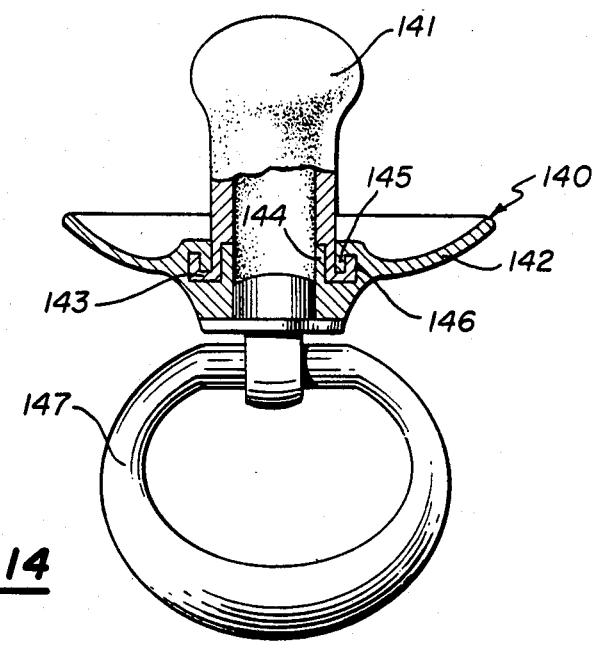
FIG. 14 is an elevational view with portions broken away of a modified form of pacifier.

In a similar way, FIG. 13 shows the mold 125 for forming the cap portion 112. An injection port 131 leads into the cavity. The upper part of the mouth portion is inserted in a first part 126 of the mold with the appendage extending downwardly into a portion of the cavity formed in a third part 128. The cap cavity is formed in the first part 126, the second part 127, and the third part 128.

The pacifier 140 shown in FIG. 114 uses a means for locking together an elastomer mouth portion 141 to a semi-rigid polymer base portion 142 that is similar to the system shown in the nipple of FIG. 10. The mouth portion has a lower appendage 143 that has a U-shaped cross-section about which the base portion is molded. A tubular portion 144 supports the inner surface of the appendage, a tubular portion 145 extends into the groove in the appendage, and a wall 146 supports the outside of the appendage. The usual pacifier ring 147 is pivotally mounted on the base portion.

Figure 15:
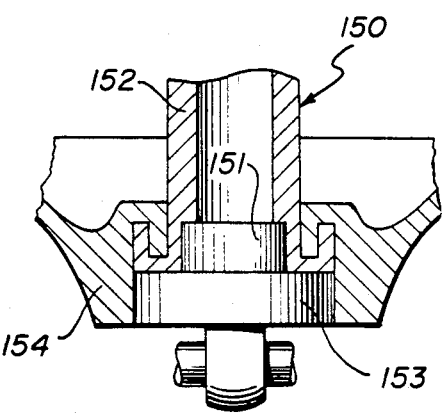
FIG. 15 is a vertical sectional view of a portion of a still further modification of the pacifier.

In FIG. 15, a pacifier 150 is shown in which a plug 151 supports the inner surface of the appendage of the mouth portion 152. A larger plug 153 supports the bottom wall of the appendage. The plug 153 is mounted in a bore formed in the base portion 154.

Figure 16:
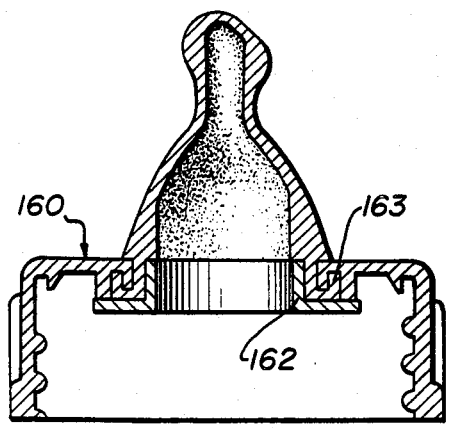
FIG. 16 is a vertical sectional view of a further modification of the nipple.
Figure 17:
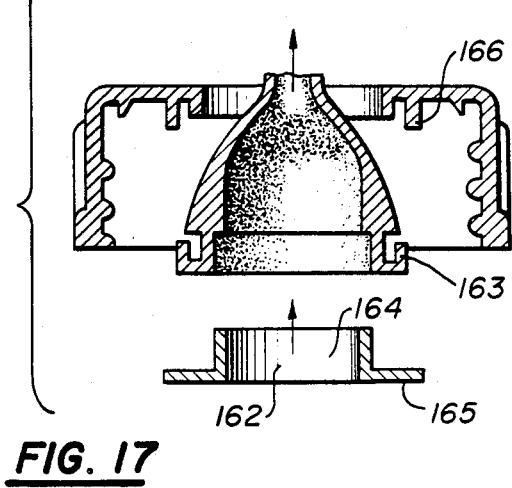
FIG. 17 is an exploded view of the nipple of FIG. 16, showing the manner of assembly of the parts.

The nipple 160 illustrated in FIG. 16 is similar to that shown in FIG. 10, but is provided with a base portion that has a separate plug 162 to support the inner wall of the appendage 163. The details are best shown in FIG. 17. The plug 162 has a tubular portion 164 that fits inside the the appendage. It also has a radial portion 165 that fits against the bottom of the appendage and is cemented or fused to a second tubular portion 166 forming part of the base portion.

An examination of FIGS. 10, 11, 14 and 16 shows that, in each case, the base portion can be described as having a cavity of annular form extending downwardly from an upper surface. The cavity is concentric with the skirt of the mouth portion. The cavity has a U-shaped cross-section defined by a first tubular leg that opens at the upper end on the said surface and a second tubular leg which is concentric with the first leg and joined to it by a radial passage. The skirt of the mouth portion enters the cavity through the said opening; it passes down the first leg, through the radial passage, and up the second leg. In this way, the mouth portion is securely locked to the base portion.

More specifically, the radial dimension (thickness) of the second leg is substantially greater than (a) the first leg, and (2) the vertical dimension of the radial passage. This construction serves to inhibit the pulling of the skirt from the cavity.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Nipple, comprising:

(a) a mouth portion of orthodontic shape formed of an elastomer and having a skirt with an annular appendage of U-shaped cross-section, and (b) a base portion made of a semi-rigid polymer and formed around the skirt of the mouth portion to interlock with the appendage, the base portion having a tubular portion that lies inside the skirt and presses outwardly against the appendage.

2. Nipple as recited in claim 1, wherein the base portion has a second tubular portion that lies outside the appendage and presses inwardly against it.

3. Nipple as recited in claim 2, wherein the base portion has a third tubular portion that lies in the appendage and engages the facing surfaces of the U-shaped cross-section.

4. Nipple, comprising:

(a) a mouth portion of orthodontic form made of an elastomer and having a generally tubular skirt, (b) a base portion made of semi-rigid polymer, the base portion having a cavity of annular form, which cavity is concentric with the skirt of the mouth portion, wherein the cavity, has a U-shaped cross-section defined by a first tubular leg having an opening onto an outer surface of the base portion and a second tubular leg concentric with the first leg and joined to it by a radial passage, the skirt of the mouth portion entering the cavity through the opening into the first leg, filling the first leg, the radial passage, and the second leg to lock the mouth portion securely to the base portion.

5. Nipple as recited in claim 4, wherein the radial dimension of the second leg is substantially greater than that of the first leg and the vertical dimension of the said radial passage in order to resist the pulling of the skirt from the cavity.

* * * * *